Sept. 29, 1931.                H. D. GEYER                1,825,392

MOLDED STEERING WHEEL

Filed April 30, 1928

Inventor
Harvey D. Geyer
By Spencer Hardman & Fehr
his Attorney

Patented Sept. 29, 1931

1,825,392

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

MOLDED STEERING WHEEL

Application filed April 30, 1928. Serial No. 274,048.

This invention relates to handwheels, especially to the manufacture of such wheels as are adapted for use as steering wheels on automotive vehicles.

An object of this invention is to provide an efficient, well appearing, and very economically made form of handwheel having a nonmetallic covering molded upon a metal skeleton.

A more specific object is to provide such a steering wheel having an enlarged central metal cup thereupon for mounting various controls therein, said central cup being encased in molded material whereby to obviate the necessity of polishing or otherwise finishing the surface of said metal cup.

A feature of the invention is the detailed construction thereof whereby the cost of manufacture is reduced.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the drawings.

Figure 1:
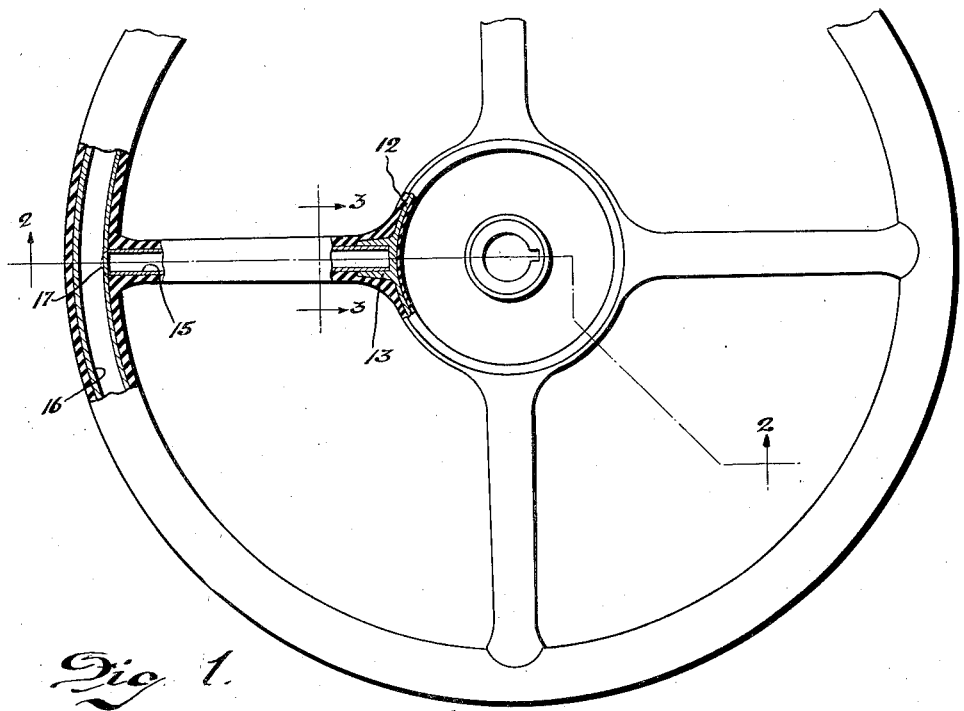
Fig. 1 is a plan view, partly in horizontal section, of an automobile steering wheel built according to this invention.
Figure 2:
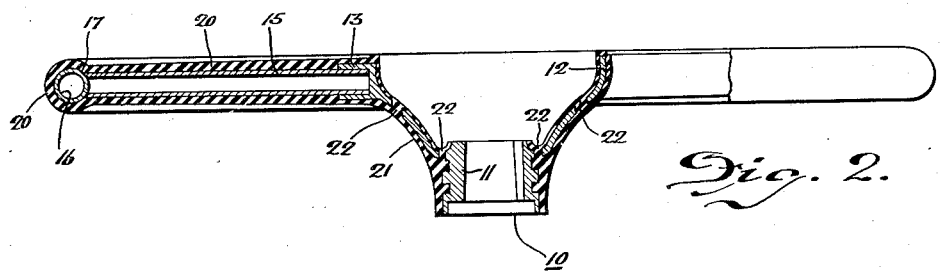
Fig. 2 is a vertical section taken on the line 2—2 of Fig. 1.
Figure 3:
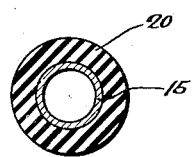
Fig. 3 is a sectional view taken on the line 3—3 of Fig. 1.

Referring to the drawings, 10 designates a hub casting, preferably of malleable iron, having a sleeve portion 11 adapted to be keyed upon the tapered end of a shaft (not shown) and having an upwardly and outwardly flaring central cup portion 12 integral therewith within which various controls such as spark, throttle, ignition, or vehicle light controls may be mounted. Cup portion 12 has integral therewith four spoke sockets 13 radiating from the periphery thereof, as clearly illustrated. Four round tubular steel spokes 15, preferably about 16 gauge welded seam steel tubes, have their inner ends rigidly fixed within sockets 13, preferably by a pressed fit and brazing. A rim reinforcing annulus 16, preferably of 16 gauge seamless steel tube, is provided and the outer ends of the steel spokes are arced out, as shown at 17, to fit snugly up around the curvature of the steel rim 16. These outer ends 17 of the steel spokes 15 are then welded to the steel rim 16 to form a very strong and rigid construction.

The metal skeleton, thus formed, is then overlaid with a plastic unvulcanized rubber compound and put in a suitable vulcanizing mold and the rubber casing vulcanized in place to form a hard well appearing non-metallic casing 20 enveloping the steel rim and spokes. Preferably this hard rubber casing also encases the cut portion 12 and sleeve portion 11 of the hub casting. In order to give a firm and permanent anchor of the relatively thin rubber casing 21 on the cup portion 12, this cup portion is provided with a plurality of spaced holes 22 and the rubber covering is molded upon both the interior and exterior of the metal cup 12, the rubber flowing during vulcanization through the spaced holes 22 and thus firmly tying the interior and exterior casings together.

Another advantage of the interior rubber casing is that it forms a non-corrodible electric insulating interior coating for cup 12 and hence serves as electric insulation for electric switches which are to be mounted therein. It is obvious from the drawings that the wheel shown therein has no exposed metal surfaces which will require polishing or finishing and hence the cost of manufacture is greatly reduced.

While the form of embodiment of the present invention as herein disclosed, constitutes a preferred form, it is to be understood that other forms might be adopted, all coming within the scope of the claims which follow.

What is claimed is as follows:

1. In a steering wheel, a metal hub having a sleeve portion adapted to fit a shaft and an upwardly and outwardly flaring central cup portion, said cup portion having radiating sockets formed on the periphery thereof, a plurality of tubular metal spokes rigidly fixed in said sockets, a tubular metal rim rigidly fixed to the spoke ends, and a hard rubber casing vulcanized upon said rim, spokes, and central cup portion of said hub.

2. In a steering wheel, a metal hub having a sleeve portion adapted to fit a shaft and an upwardly and outwardly flaring central cup portion, said cup portion having relatively short sockets radiating from the upper periphery thereof, a plurality of tubular metal spokes rigidly fixed in said sockets at their inner ends, a tubular metal rim rigidly fixed to the outer ends of said spokes by welding the open ends of said spokes to said tubular rim, and a hard rubber casing vulcanized upon said rim, spokes, and central cup portion of said hub.

3. In a steering wheel, a metal hub having an outwardly flaring metal cup portion and radiating sockets formed on the periphery of said cup portion, tubular steel spokes having their inner ends fixed within said sockets, and having open outer ends, a tubular steel rim fixed to the outer open ends of said tubular spokes by being welded thereto, and a composition casing molded upon and covering said rim, spokes, and central cup portion of said hub.

4. In a steering wheel, a metal hub having a sleeve portion adapted to fit a shaft and an upwardly and outwardly flaring central cup portion, said cup portion having radiating sockets formed on the periphery thereof, metal spokes having their inner ends rigidly fixed within said sockets, a metal rim rigidly fixed to the spoke outer ends, and a rubber composition casing molded upon and covering said rim, spokes, and both the interior and exterior of said central cup portion of said hub.

5. A steering wheel comprising: a metal hub having a sleeve portion adapted to be fixed to a shaft and an upper central cup portion thereabove, metal spokes having their inner ends fixed to the periphery of said cup portion, a metal annulus fixed to the outer ends of said spokes, and a moldable composition casing molded upon and encasing said rim, spokes, and both the interior and exterior of said central cup portion of said hub.

In testimony whereof I hereto affix my signature.

HARVEY D. GEYER.